US008802207B2

United States Patent
Akkapeddi

(10) Patent No.: US 8,802,207 B2
(45) Date of Patent: Aug. 12, 2014

(54) IN-SITU POLYMERIZED POLYMER-PLATINUM GROUP METAL NANOPARTICLE BLENDS AND OXYGEN SCAVENGING CONTAINERS MADE THEREFROM

(71) Applicant: Graham Packaging Company, L.P., York, PA (US)

(72) Inventor: Murali K. Akkapeddi, York, PA (US)

(73) Assignee: Graham Packaging Company, L.P., York, PA (US)

( * ) Notice: Subject to any disclaimer, the term of this patent is extended or adjusted under 35 U.S.C. 154(b) by 0 days.

(21) Appl. No.: 13/951,966

(22) Filed: Jul. 26, 2013

(65) Prior Publication Data

US 2014/0034641 A1 Feb. 6, 2014

Related U.S. Application Data

(60) Provisional application No. 61/678,365, filed on Aug. 1, 2012.

(51) Int. Cl.
| | |
|---|---|
| B65D 43/00 | (2006.01) |
| B29D 22/00 | (2006.01) |
| B29D 23/00 | (2006.01) |
| B32B 1/08 | (2006.01) |
| B32B 15/08 | (2006.01) |
| C08F 2/44 | (2006.01) |
| C08K 3/10 | (2006.01) |
| C08K 3/38 | (2006.01) |
| C08K 3/00 | (2006.01) |
| C08G 18/08 | (2006.01) |
| B65D 81/26 | (2006.01) |

(52) U.S. Cl.
CPC .............. *B65D 81/266* (2013.01); *B65D 43/00* (2013.01); *B29D 22/00* (2013.01); *B29D 23/00* (2013.01); *B32B 1/08* (2013.01); *B32B 15/08* (2013.01); *C08F 2/44* (2013.01); *C08K 3/10* (2013.01); *C08K 3/38* (2013.01); *C08K 3/00* (2013.01); *C08G 18/08* (2013.01)
USPC ...... 428/35.8; 428/35.7; 220/200; 264/328.1; 264/531; 524/765; 524/779; 524/785

(58) Field of Classification Search
CPC ...... B65D 81/266; B65D 43/00; B29D 22/00; B29D 23/00; B32B 1/08; B32B 15/08; C08F 2/44; C08K 3/10; C08K 3/38; C08K 3/00; C08G 18/08
USPC ........ 220/200; 264/328.1, 531; 524/765, 779, 524/785; 428/35.7, 35.8
See application file for complete search history.

(56) References Cited

U.S. PATENT DOCUMENTS

| | | | |
|---|---|---|---|
| 5,419,936 | A | 5/1995 | Tindale |
| 2004/0021133 | A1 | 2/2004 | Nagpal et al. |

(Continued)

FOREIGN PATENT DOCUMENTS

| | | |
|---|---|---|
| EP | 2404753 A1 | 1/2012 |
| FR | 2850661 | 8/2004 |

(Continued)

OTHER PUBLICATIONS

International Search Report and Written Opinion mailed Oct. 15, 2013 by the European Patent Office as International Searching Authority for corresponding international patent application No. PCT/US2013/052267.
Database WPI, Week 201048 Thomson Scientific, London, GB; AN 2010-H85685 XP002712311 for JP 2010 150348 A (Teijin Ltd) Jul. 8, 2010, abstract.
Database WPI, Week 201247 Thomson Scientific, London, GB; AN 2012-H62623 XP002712312 for WO 2012/089081 A1 (Shanghai Genius Advanced Material Co Ltd) Jul. 5, 2012, abstract.

(Continued)

*Primary Examiner* — Michael C Miggins
(74) *Attorney, Agent, or Firm* — Stradley Ronon Stevens & Young, LLP

(57) ABSTRACT

A method of making a polymer composition comprising dispersed nanoparticles of an oxygen scavenging catalyst includes polymerizing one or more monomers or pre-polymers in the presence of a platinum group metal catalyst or precursor to obtain a polymer composition having dispersed nanoparticles of the platinum group metal. The oxygen scavenging catalyst is added during the polymerization as a solution of the platinum group metal or a compound thereof and a polyhydric alcohol (e.g., glycols). The food or beverage containers made from such polymer compositions exhibit high clarity and high oxygen scavenging properties.

20 Claims, 1 Drawing Sheet

(56) References Cited

U.S. PATENT DOCUMENTS

| | | |
|---|---|---|
| 2010/0028499 A1 | 2/2010 | Rule et al. |
| 2010/0267885 A1 | 10/2010 | Harimoto |
| 2012/0114529 A1 | 5/2012 | Carmichael et al. |
| 2012/0118764 A1 | 5/2012 | Valus et al. |

FOREIGN PATENT DOCUMENTS

| | | |
|---|---|---|
| GB | 2207439 A | 2/1989 |
| JP | 2010150348 | 7/2010 |
| WO | 2009/120916 | 10/2009 |
| WO | 2012/089081 | 7/2012 |

OTHER PUBLICATIONS

Mallick, K. et al, "Gas phase hydrogenation reaction using a 'metal nanoparticle-polymer' composite catalyst" J. Mater Sci (2008) 43: 6289-6295.

Mallick, K., et al., "Catalytic activity of a soft composite material: Nanoparticle location—activity relationship" Materials Science and Engineering B 150 (2008) 43-49.

Chen et al, "Preparation and Characterization of Palladium Colloidal Nanoparticles by Thermal Decomposition of Palladium Acetate with Microwave Irradiation" J. Mater. Sci. Technol. vol. 21, No. 2, 2005 187-190.

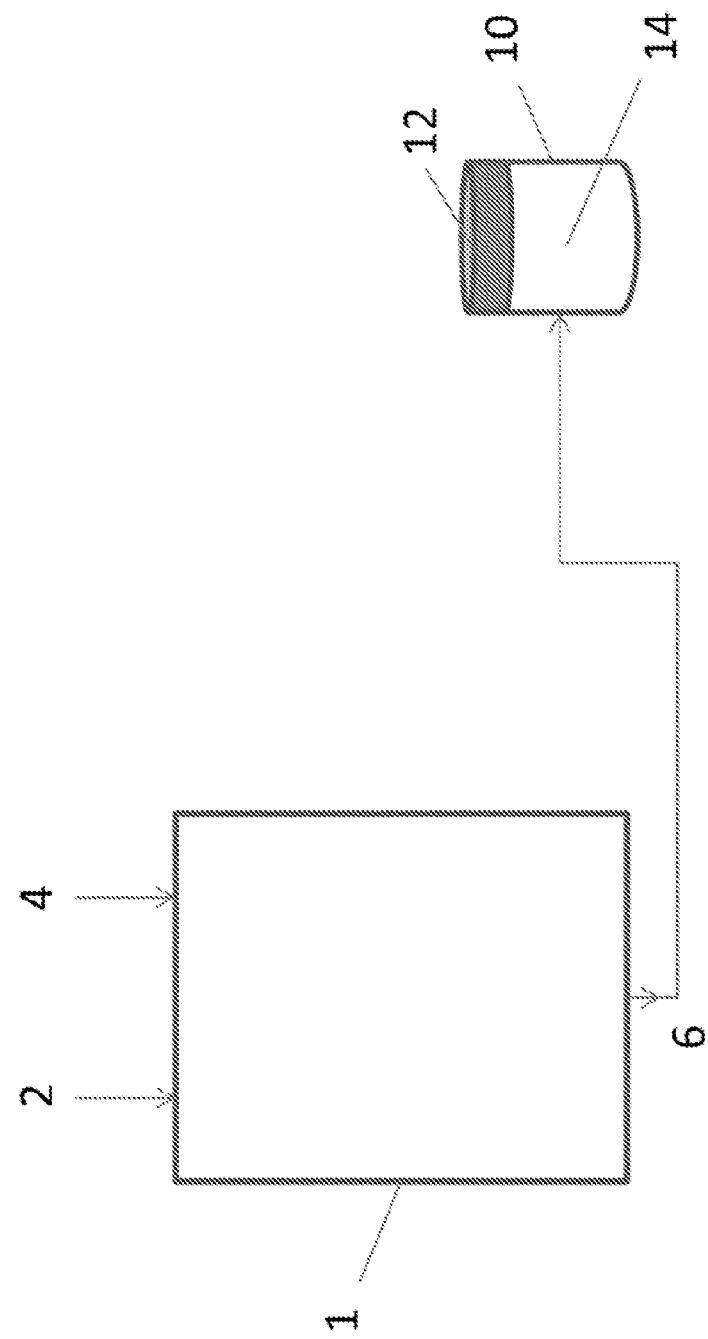

IN-SITU POLYMERIZED POLYMER-PLATINUM GROUP METAL NANOPARTICLE BLENDS AND OXYGEN SCAVENGING CONTAINERS MADE THEREFROM

CROSS-REFERENCE TO RELATED APPLICATIONS

This application claims the benefit of priority under 35 U.S.C. §119(e) to earlier filed U.S. patent application Ser. No. 61/678,365, filed on Aug. 1, 2012, the disclosure of which is incorporated herein by reference in its entirety.

BACKGROUND OF THE INVENTION

The present invention relates to methods of making polymers containing dispersed nanoparticles of a platinum group metal, such as palladium, and containers made from the polymer-platinum group metal nanoparticle blends, which exhibit high oxygen scavenging properties and high clarity.

All references, including publications, patent applications, and patents, cited herein are hereby incorporated by reference to the same extent as if each reference were individually and specifically indicated to be incorporated by reference and were set forth in its entirety herein.

Oxygen-sensitive food products including, for example, tomato-based ketchups, sauces, etc., and beverage products, such as orange juice, beer, green tea, etc., require a packaging material with high oxygen barrier properties or blocking oxygen ingress into the packaging in order to preserve the freshness and flavor of the package contents over time. Although metal cans and glass jars have traditionally been used as oxygen-impervious containers, there is a desire to use plastic containers, for example, due to their durability and strength. Plastic containers typically only offer moderate gas barrier properties, however. Plastic containers may also exhibit haze or poor clarity. For example, undesirable haze may result from the immiscibility of the polymer materials or other ingredients. Blends of dissimilar chemical structures can lead incompatibility, phase separation, and ultimately, poor clarity. Thus, there is a desire to produce plastic packaging materials (e.g., films, bottles, containers) which exhibit both high oxygen scavenging properties and high clarity and transparency.

U.S. Publication No. 2010/0028499 describes containers having walls made of a polymeric matrix where a catalyst for catalyzing the reaction of hydrogen with oxygen is dispersed in the polymeric matrix. The catalyst may be incorporated into the polymeric matrix during melt processing, for example, after the polymer has been formed.

It is believed that such blending techniques with a pre-formed polymer can result in a number of drawbacks. First, the decomposition products or volatiles of the catalyst precursor and any possible liquid carriers may remain in the resulting polymer unless the polymer undergoes some further processing, such as vacuum stripping. Second, because of the high melt viscosity of the pre-formed polymer, the uniformity of the catalyst mixing and distribution is not assured at low catalyst levels, which could result in non-uniform scavenging performance from container to container. Third, the polymer may not exhibit good clarity or transparency due to the poor mixing as descried above and the resulting catalyst particle aggregates of large size.

SUMMARY OF THE INVENTION

The present invention provides methods of making polymers and containers made therefrom which exhibit high oxygen scavenging properties and high clarity. The polymers include highly dispersed nanoparticles (e.g., average diameter of 5 nm or less) of at least one platinum group metal catalyst, which provides good and uniform oxygen scavenging properties. The uniform and fine nanoscale dispersion of a small amount (e.g., 10 ppm or less) of platinum group metal catalyst provides for polymers with high clarity and high transparency (e.g., 85% transmission or greater). Additionally, most or all of the decomposition products or volatiles, for example, from the catalyst precursor and liquid carrier, are removed during the polymerization process.

In one aspect of the present invention, a method of making a polymer composition comprising dispersed nanoparticles of an oxygen scavenging catalyst includes polymerizing one or more monomers or pre-polymers in the presence of a catalyst or catalyst precursor comprising a platinum group metal to obtain a polymer composition comprising dispersed nanoparticles of the platinum group metal. The catalyst or catalyst precursor is added before or during the polymerization as a solution comprising the platinum group metal or a compound thereof and a polyhydric alcohol (e.g., glycols).

In another aspect of the present invention, a method of making a polyethylene terephthalate composition comprising dispersed nanoparticles of palladium (the oxygen scavenging catalyst) includes adding a glycol solution comprising a palladium compound before or during polymerization of polyethylene terephthalate to form a polyethylene terephthalate composition comprising dispersed nanoparticles of palladium.

In another aspect of the present invention, a food or beverage container includes a wall comprising a polymer composition having dispersed nanoparticles (the oxygen scavenging catalyst); and a closure comprising a hydrogen generating material, such as sodium borohydride. The hydrogen produced by the hydrogen generating material and any oxygen present (e.g., the oxygen permeating the wall of the container) react in the presence of the oxygen scavenging catalyst to produce water, which is typically present in the food or beverage within the container. Thus, the food or beverage container exhibits high and uniform oxygen scavenging properties. Additionally, the food or beverage container exhibits high clarity and high transparency (e.g., 85% transmission or greater). The food or beverage container may be particularly suitable for heat-set, hot-fillable jars useful for packaging long-shelf life foods, such as pasta sauces, salsas, and the like.

BRIEF DESCRIPTION OF THE DRAWINGS

The invention may be further understood by reference to the following FIGURE in which:

FIG. 1 depicts a flow chart of one embodiment of the present invention.

DETAILED DESCRIPTION OF THE INVENTION

The polymer-platinum group metal nanoparticle blends may be used to form packaging and containers having high clarity and consistently high oxygen scavenging properties, especially when used in conjunction with a hydrogen-generating material.

In one embodiment, a method of making a polymer composition comprising dispersed nanoparticles (e.g., the oxygen scavenging catalyst) includes polymerizing one or more monomers or pre-polymers in the presence of a catalyst or catalyst precursor comprising a platinum group metal or compound thereof to obtain a polymer composition comprising dispersed nanoparticles of the platinum group metal therein.

As used herein and in the claims, the terms "comprising" and "including" are inclusive or open-ended and do not exclude additional unrecited elements, compositional components, or method steps. Accordingly, the terms "comprising" and "including" encompass the more restrictive terms "consisting essentially of" and "consisting of." Unless specified otherwise, all values provided herein include up to and including the endpoints given, and the values of the constituents or components of the compositions are expressed in weight percent or % by weight of each ingredient in the composition.

The one or more monomers or pre-polymers may be selected by one of ordinary skill in the art depending on the polymer desired. Polymers include materials formed by polymerizing monomers or pre-polymers. The polymers may include condensation polymers or addition polymers. Suitable polymers obtainable from the polymerization of the one or more monomers or pre-polymers may include, for example, polyesters (including but not limited to polyethylene terephthalate (PET), polyethylene isophthalate (PEI), polyethylene 2,6-naphthalate (PEN)), polyamides (including but not limited to poly[caprolactam] (PA-6), poly[hexamethylene adipamide] (PA-66), poly[m-xylylene adipamide] (PA-MXD6)), thermoplastic polyurethanes, polyolefins (including but not limited to polypropylene, polyethylene, poly (ethylene-co-vinyl alcohol)), polystyrene, poly(styrene-co-acrylonitrile), polyvinyls (including but not limited to poly(vinyl chloride)), and copolymers, blends, and combinations thereof. Each polymer described herein, unless designated otherwise, includes homopolymers, heteropolymers, copolymers, terpolymers, and the like. The polymer composition may or may not be modified. For example, in the case of polyethylene terephthalate (PET), the polymer structure may be modified with one or more glycol comonomers, such as diethylene glycol, polytetramethylene glycol, 1,4-cyclohexanedimethanol and/or other dicarboxylic acid comonomers, such as isophthalic acid, 2,6-naphthalene dicarboxylic acid, and the like.

The term "monomers" may include small molecules that become chemically bonded to each other to form a polymer. In particular, suitable monomers may include low molecular weight monomers (e.g., average molecular weights less than 700 Daltons) or medium or high molecular weight monomers (e.g., average molecular weights greater than 700 Daltons). For example, polyesters are formed by the polycondensation reaction between glycol monomers and dicarboxylic acid or ester monomers. Hence, examples of polyester forming monomers may include glycols such as ethylene glycol, diethyleneglycol, 1,4-cylohexane dimethanol used in combination with dicarboxylic acid or ester monomers such as terephthalic acid, isophthalic acid, dimethyl terephthalate or dimethyl isophthalate, etc. Polyamide forming monomers may include lactams such as caprolactam or laurolactam. Polyamides may also be formed by the polycondensation of diamine monomers such as hexamethylene diamine, m-xylylenediamine etc. with dicarboxylic acid monomers such as adipic acid, terephthalic acid isophthalic acid etc. For polyolefin polymers, olefinic monomers such as ethylene, propylene, butylenes, 1-hexene, styrene, and 1-octene may be employed. Similarly, suitable vinyl monomers such as vinyl chloride, vinyl acetate and acrylic monomers such as acrylonitrile or methyl acrylate may be polymerized in combination with olefin or styrene monomers to obtain the desired polymers.

The term "pre-polymers" may include any medium molecular weight compound (e.g., average molecular weight about 700 to 1500 Daltons) that can be polymerized further. For example, this may include macromers or a system of monomers that have been pre-reacted to an intermediate state. An example of such prepolymer is poly(tetramethylene oxide) glycol of ca. 1000 molecular weight.

In an exemplary embodiment, the polymer composition comprises a polyester and in particular, a polyalkylene terephthalate. Preferably, the polymer composition comprises polyethylene terephthalate (PET). For example, the polymer composition may comprise at least about 50 wt. %, at least 80 wt. %, at least 90 wt. %, and preferably, at least 95 wt. % polyester, and particularly, PET, based on the combined weight of all polymers in the polymer composition. In some embodiments, the polyester polymer composition contains at least about 90 mole % ethylene terephtalate repeat units, at least 92 mole % ethylene terephtalate repeat units, or at least 94 mole % ethylene terephtalate repeat units, based on the moles of all repeat units in the polyester polymer composition. In the case of polyethylene terephthalate, the main monomers are ethylene glycol and terephthalic acid (or dimethyl ester) and optionally employing minor amounts of other comonomers such as isophthalic acid, cyclohexane dimethanol, diethylene glycol etc.

Polyesters, such as PET, may be made by reacting a glycol with a dicarboxylic acid, as the free acid or its dimethyl ester, to produce an ester monomer and/or oligomers, which are then polycondensed to produce the polyester. For example, polyethylene terephthalate may be formed from a transesterification stage and a polycondensation stage in a reactor as follows. Terephthalic acid (TPA) or dimethyl terephthalate (DMT) and excess ethylene glycol may be combined with a transition metal catalyst (e.g., an antimony catalyst) and heated until the mixture melts. Under heating and agitation, the ethylene glycol reacts with the TPA or DMT to form bis(hydroxyethyl)terephthalate (the transesterification stage). The condensation byproduct (water or methanol) may be distilled off from the reactor. The pressure may be reduced and temperature raised in order to distill the excess ethylene glycol (the polycondensation stage). The reactor may be returned to atmospheric pressure and the molten PET is removed from the reactor. The polymerization may be run without solvents (e.g., a melt condensation).

The one or more monomers or pre-polymers are polymerized in the presence of a catalyst or catalyst precursor comprising a platinum group metal. The catalyst or precursor comprising a platinum group metal is not present in order to catalyze the polymerization reaction (although it may potentially have some impact or may also be used as a catalyst for the polymerization reaction). Instead, the platinum group metal catalyst is an oxygen scavenging catalyst intended to be incorporated as discrete particles (e.g., nanoparticles) within the resulting polymer. Thus, the purpose of the oxygen scavenging catalyst is to catalyze the reaction of hydrogen with oxygen (e.g., an oxygen scavenging reaction) to minimize and reduce the oxygen content in the resulting packaging or container. The oxygen scavenging reaction of $2H_2+O_2 \rightarrow H_2O$ occurs in the presence of the oxygen scavenging catalyst (e.g., a platinum group metal catalyst) incorporated within and dispersed throughout the package or container wall. The oxygen scavenging catalyst results in conversion of the hydrogen and oxygen to water, an innocuous byproduct.

The catalyst used for the oxygen scavenging reaction includes at least one platinum group metal. The platinum group metals (PGMs) consist of six elements in Groups 8-10 (VIII) of the PeriodicTable. The platinum group metals include ruthenium, rhodium, palladium, osmium, iridium, and platinum. Palladium and platinum may be especially preferred because of their low toxicity and extreme efficiency in catalyzing the conversion of hydrogen and oxygen to water with little or no byproduct formation. In an exemplary embodiment, the platinum group metal comprises palladium. Preferably, the catalyst nanoparticles dispersed in the polymer composition consist of pure or substantially pure metal. In other words, the platinum group metal obtained as nanoparticles within the polymer composition is preferably an elemental metal (e.g., $Pd^0$) and not a platinum group metal compound.

Other catalysts, to assist in the polymerization process or for the oxygen scavenging reaction, may also be included with the platinum group metal catalyst. For example, additional catalysts may include, but are not limited to transition metals (e.g., cobalt, iron, and nickel), metal borides (such as nickel boride), metal carbides (such as titanium carbide), metal nitrides (such as titanium nitride), and transition metal salts and complexes. In particular, antimony or antimony compounds may be used as a catalyst in the polymerization of polyethylene terephthalate. In one embodiment, only the platinum group metal catalyst is incorporated in the polymer matrix and any other catalyst used in the polymerization is of negligible quantities in the resulting polymer or is removed during or after polymerization.

Other additives or ingredients known in the art may also be incorporated with the monomer(s), pre-monomer(s), and catalyst(s) in order to assist in the polymerization or processing or to assist in the functioning of resulting product made from the polymer composition, including stabilizers, diluents, solvents, antioxidants, plasticizers, fillers, colorants, adhesion promoters, co-reactants, chain extenders, UV absorbing additives, and the like. Preferably, the total quantity of such components are less than about 10% by weight, 5% by weight, or even 3% by weight, relative to the total weight of the polymer composition.

The catalysts described in this document may be added before or during the polymerization in the form of a catalyst precursor. The term "catalyst precursor" refers to a compound containing one or more catalytically active metals, from which compound the catalyst is eventually formed. In other words, the catalyst precursor (e.g., platinum group metal compound) can be transformable into the catalyst (e.g., platinum group metal) for example, via thermal treatment, chemical reaction, or by any other suitable treatment. In particular, the platinum group metal catalyst may be provided before or during the polymerization in the form a platinum group metal compound or salt. For example, the catalyst or precursor, when added to or incorporated during polymerization, may comprise a platinum group metal compound comprising a carboxylate (e.g., an acetate), a sulfonate, a mesylate, or a phosphanate. In an exemplary embodiment, the platinum group metal compound comprises an acetate compound. In the case of palladium, the platinum group metal compound may include palladium acetate, for example. Thus, the platinum group metal catalyst may be added as, for example, an acetate compound before or during the polymerization process.

The catalyst or precursor may thermally dissociate during the polymerization process to provide the nanoparticles of platinum group metal catalyst in the resulting polymer composition. During polymerization, the temperatures reached may be well in excess of the melting point of the polymer(s). For example, the temperatures may easily reach 80° C.-100° C. above the melting point of the polymer. Thus, for the case of palladium acetate, the acetate or acetoxy radical, for example, can be thermally dissociated during the polymerization. Therefore, the acetate ion or acetoxy radical may be easily removed or recovered from the polymer composition, for example, as volatiles released during the polymerization process. This may be depicted as follows:

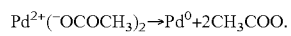
$$Pd^{2+}(^-OCOCH_3)_2 \rightarrow Pd^0 + 2CH_3COO.$$

In the presence of an alcohol (ROH), the palladium and dissociated acetoxy radicals may be converted to volatiles, which may be depicted as follows:

$$Pd^0 + 2CH_3COO. \rightarrow CO_2 + CH_3COOR + CH_4 \text{ (volatiles)}.$$

In other words, for the case of palladium acetate, the palladium metal dissociation which occurs in-situ during the polymerization results in nanoparticles of palladium dispersed within the polymer and the remaining compounds may be released, for example, as small quantities of volatiles during the process. Accordingly, the resulting polymer composition may contain very little to no residual decomposition products. Although palladium acetate is described in detail herein, it is understood that the other platinum group metal compounds would follow similar mechanisms of dissociation and removal or decomposition of volatiles as would be understood by one of ordinary skill in the art.

The catalyst or catalyst precursor is added before or during the polymerization as a solution comprising the platinum group metal and a polyhydric alcohol (i.e., alcohols with more than one hydroxyl (—OH) radical), such as diols or glycols. For example, the polyhydric alcohol may include, but is not limited to, ethylene glycol, diethylene glycol, triethylene glycol, tetraethylene glycol, trimethylene glycol, propylene glycol, butylene glycol, neopentyl glycol, butane diol, hexane diol, octane diol, 1,4-cyclohexane dimethanol, polyether diols, such as polyethylene glycol, poly (THF) glycol, or polytetramethylene glycol. In particular, the polyhydric alcohol may include ethylene glycol, diethylene glycol, polytetramethylene glycol, 1,4-cyclohexane dimethanol, and mixtures thereof. In an exemplary embodiment, the polyhydric alcohol is selected from the group consisting of ethylene glycol, diethylene glycol, 1,4-cyclohexane dimethanol and the mixtures thereof.

In one embodiment, the dihydric alcohol includes a $C_2$-$C_4$ alkane diol. In an exemplary embodiment, the dihydric alcohol comprises a glycol, such as ethylene glycol, propylene glycol, butylene glycol, 1,4-cyclohexane dimethanol or mixtures thereof. In a preferred embodiment, the polyhydric alcohol comprises ethylene glycol.

The solution may contain suitable amounts of each of the platinum group metal compound and the polyhydric alcohol. Preferably, the platinum group compound is contained in the solution in amounts of about 0.01 ppm to 100 ppm (e.g., 100 ppm or less), preferably 0.1 ppm to 10 ppm (e.g., 10 ppm or less), and more preferably 0.1 ppm to 5 ppm (e.g., 5 ppm or less) of platinum group metal catalyst or catalyst precursor. The polyhydric alcohol may be present in suitable amounts as well. For example, the polyhydric alcohol may be present in amounts ranging from between about 0.01% to 50%, preferably about 0.01% to 10%, more preferably about 0.01% to 5%, and even more preferably about 0.01% to 2% based on the total weight of the solution. The solution may be aqueous (comprising water), neat, or comprising other suitable solvents (including other alcohols, such as monohydric alcohols) known in the art.

Without wishing to be bound by theory, it is believed that the presence of at least one polyhydric alcohol, such as ethylene glycol, facilitates a cleaner thermal dissociation of the platinum group metal compound (e.g., palladium acetate). For example, the polyhydric alcohol may lead to a finer nano dispersion of the platinum group metal catalyst (e.g., a nano-Pd dispersion). Additionally, the polyhydric alcohol may help to avoid agglomeration of the nanoparticles (e.g., more uniformly disperse the nanoparticles within the polymer) and to stabilize the nanoparticles once formed. As a result, the polyhydric alcohol may help to improve either or both the clarity of the resulting polymer composition and the catalyst efficiency. In particular, the formation of smaller sized nanoparticles, which are uniformly dispersed, may result in a higher catalyst efficiency for the oxygen scavenging reaction.

FIG. 1 depicts a flow chart representing one embodiment of the invention where a platinum group metal solution 2 is introduced into a reaction vessel 1 with standard monomers 4. The platinum group metal solution 2 may include a platinum group metal compound (such as palladium acetate) in a polyhydric alcohol (such as glycol). The standard monomers 4 may include, for example, PET monomers and an antimony catalyst. The reaction vessel 1 allows for polymerization of the monomers and in-situ generation of the nanoparticles (e.g., palladium nanoparticles). The polymer composition 6 containing, for example, a molten form of the polymer resin with dispersed nanoparticles of the platinum group metal catalyst is formed into and makes up the wall 14 of the container 10. The container 10 may be sealed with a suitable closure 12.

The reactants can be combined simultaneously or sequentially and may be polymerized using any suitable techniques and equipment known in the art. For example, the reaction vessel 1 or reactor may be of any suitable type, shape, and size. For example, the reactor may be a fixed or fluid catalyst bed reactor, a tubular reactor, etc. The reactions may be carried out batch wise, continuous, or any combination of these. The reaction vessel 1 may also incorporate additional equipment including mixers, heat exchangers, pumps, feeders, recycle, and other pieces of equipment known to those skilled in the art. The reactions may be performed using a wide variety of process parameters and process conditions readily ascertainable to one of ordinary skill in the art based on the teachings provided herein.

In the case of a polyester, such as PET, the polyester melt phase manufacturing process may include (1) direct condensation of a dicarboxylic acid with the diol, optionally, in the presence of esterification catalysts, in an esterification zone; (2) polycondensation in prepolymer and finishing zones, optionally, in the presence of a polycondensation catalyst; and (3) an ester exchange, optionally, in the presence of a transesterification catalyst in an ester exchange zone, followed by prepolymerization and finishing, optionally, in the presence of a polycondensation catalyst. The catalysts used in each stage may be the same or different. The reaction vessel 1 may be operated at any suitable temperatures and pressures necessary for the polymerization reaction desired. For example, the melt phase processing may operate in a temperature zone of about 100° C. to about 500° C., preferably about 250° C. to about 300° C., and under a positive pressure ranging from about 0 psig to about 900 psig.

In an exemplary embodiment, a method of making a polyethylene terephthalate composition comprising dispersed nanoparticles of an oxygen scavenging catalyst (e.g., palladium) includes combining or adding a glycol solution comprising a palladium compound (e.g., palladium acetate) during polymerization of polyethylene terephthalate to form a polyethylene terephthalate composition comprising dispersed nanoparticles of palladium, which function as the oxygen scavenging catalyst in the resulting container.

The resulting polymer composition includes dispersed nanoparticles of the platinum group metal. The composition may be termed a "dispersion" having one composition consisting of the finely divided particles (e.g., in a colloidal size range) distributed throughout a different composition, the polymer composition (i.e., a bulk substance) where the particles are the dispersed phase and the bulk substance is the continuous or external phase. For example, the polymer composition may comprise a substantially homogenous mixture of the dispersed catalyst nanoparticles, where the particles are substantially evenly distributed throughout the polymer composition.

The resulting catalyst nanoparticles are preferably of nano scale size. The term "nano" typically means one billionth ($10^{-9}$); for example, in the present application, dimensions measured in nanometers (nm) which correspond to $10^{-9}$ meters. It is possible, however, that some particles may be outside of the nano scale range. In one embodiment, the dispersed nanoparticles comprise an average diameter of 10 nm or less (e.g., 0.001 to 10 nm), preferably 5 nm or less (e.g., 0.001 to 5 nm), and even more preferably 3 nm or less (e.g., 0.001 to 3 nm).

Another advantage of the present invention is that only small amounts of catalyst are needed to efficiently and effectively catalyze the oxygen scavenging reaction. In other words, the catalyst nanoparticles are highly diluted within the polymer composition. For example, the polymer composition may include 0.01 ppm to 100 ppm (e.g., 100 ppm or less), preferably 0.1 ppm to 10 ppm (e.g., 10 ppm or less), and more preferably 0.1 ppm to 5 ppm (e.g., 5 ppm or less) of platinum group metal catalyst relative to the weight of the polymer composition or resulting container (excluding any contents thereof). Unless otherwise stated, reference to "ppm" refers to parts per million parts by weight.

The resulting polymer composition does not require any further processing in order to incorporate the catalyst therein. In particular, the oxygen scavenging catalyst is not melt blended with a pre-formed polymer composition. To the contrary, it is believed that subsequent processing of the polymer composition (such as by adding the catalyst after the polymer is formed, for example, via melt blending) results in a number of drawbacks including, but not necessarily limited to: (1) decomposition products or volatile organics of the catalyst precursor and any liquid carriers remaining within the resulting polymer or necessitating the need for further processing of the polymer, such as vacuum stripping, to remove such residuals; (2) poor mixing and non-uniformity of the catalyst distribution especially at low levels of the catalyst within the polymer, which could result in non-uniform and sporadic scavenging performance; and (3) poor clarity or transparency of the packaging or container (depending on the application clarity and transparency may or may not be desired). Accordingly, it is preferred that a pre-formed polymer does not undergo any melt blending, melt mixing, extrusion, or the like in order to incorporate the oxygen scavenging catalyst. Thus, the nanoparticles of catalyst are only incorporated in-situ through the polymerization process. It shall be understood, however, that subsequent processing such as melt blending, melt mixing, extrusion, or the like may occur and may be necessary to produce the packaging or container, but such subsequent processing is not for the purpose of introducing the platinum group metal catalyst nanoparticles as the oxygen scavenging material within the polymer composition.

The polymer composition comprising the dispersed nanoparticles is substantially clear or substantially transparent. The polymer composition is "substantially clear," "substantially transparent," or both meaning that the polymer composition has a high degree of light transmittance (defined as light passing through the composition) and a low haze (defined by scattered light). In other words, the polymer composition is not opaque (i.e., light transmission through an opaque composition is substantially close to zero). Clarity may also be influenced by refraction and light scattering. In an exemplary embodiment, the polymer composition may have a light transmittance of 85% or greater, preferably 90% or greater, even more preferably 95% or greater, and most preferably 97% or greater. The degree of light transmission and scattering may be determined, for example, using ASTM D-1003 (Standard Test Method for Haze and Luminous Transmittance of Transparent Plastics), which evaluates light transmission and scattering of transparent plastics for a defined specimen thickness. The perceived transparency or optical clarity is dependent on the thickness of the sample used for assessment, and the optical clarity will decrease with increasing thickness. Preferably, the polymer composition has a transparency and clarity substantially equivalent to that of glass (e.g., comparable glass containers).

Packaging or containers known in the art may be formed from the polymer composition described herein. The shape, construction, or application of the packaging and containers may be selected by one of ordinary skill in the art. For example, suitable packaging or containers may include but are not limited to films, sachets, bottles, jars, bags, pouches, trays, pails, tubs, barrels, blister packs, or other like containers. The packaging or container may be used to store any desired food, such as tomato-based products including tomato sauce, ketchup, and salsa; or beverage, such as soda, beer, wine, fruit juices, and water. The food or beverage container may include one or more walls composed of the polymer composition with dispersed nanoparticles of the platinum group metal catalyst.

The packaging or container may be made using any suitable equipment and techniques known in the art. For example, film packaging or hollow containers may be formed by injection molding, stretch blow molding, extrusion molding, and the like. For example, in a blow molding process, the polymer composition could be heated to a molten state (or maintained in a molten state following the polymerization process), extruded through a die head to form a hollow tube, which is positioned between two mold halves and inflated. The polymer composition solidifies as it is cooled inside the mold, and the finished component is removed from the mold. Thus, a wall for a package or container may be formed from the polymer composition, which already comprises the platinum group metal catalyst dispersed therein. The wall of the container may be formed into any suitable shape and size known in the art (e.g., cylinders, round, oval, squares, wide-mouthed, jugs, and specialty shapes). In terms of size, the containers may provide a volume, for example, in the range of from about 1 milliliter (ml) to 1000 liter, 20 ml to 100 liter, or 100 ml to 5 liter in capacity.

The film or wall of the container may be of any suitable thickness (such as, for example, 0.001 mm to 0.1 mm in thickness), flexibility (e.g., flexible films and bags) or rigidity (e.g., rigid or semi-rigid bottles), and may comprise a monolayer or a multilayer construction. In a multi-layered construction, optionally, one or more of the layers may include a barrier layer, such as polyethylene co-vinyl alcohols (EVOH), poly(glycolic acid), or poly(metaxylylenediamine adipamide) (MXD6 nylon). The barrier layer may provide an oxygen barrier, a moisture barrier, or both. A single layer design may be preferred for the advantages of simplicity of manufacture and cost.

In order to optimize the oxygen scavenging reaction where hydrogen and oxygen react in the presence of the oxygen scavenging catalyst (e.g., the platinum group metal catalyst) nanoparticles found in the wall of the container to produce water, it is preferable to include a hydrogen generating material in the container or as part of the container. Thus, adulteration of the product may be minimized or avoided and the storage life of the contents of the container may be improved. In an exemplary embodiment, the food or beverage container has a wall comprising the polymer composition with dispersed nanoparticles of the oxygen scavenging catalyst; and a separate closure comprising a hydrogen generating material.

The term "hydrogen generating materials" may include any materials which release molecular hydrogen. Hydrogen generating materials, may include, for example, metals, such as sodium, lithium, potassium, magnesium, zinc, aluminum, and hydrides (e.g., borohydrides) thereof. For example, the release of molecular hydrogen may occur as a result of contact with water. While in a free state, these substances may react very rapidly with water; however, by providing the hydrogen generating material in the closure (e.g., a liner of the closure) hydrogen generation may be controlled. If the rate of reaction between the active substance and water is too slow, then hydrolysis catalysts or other agents known in the art may also be employed. In an exemplary embodiment, the hydrogen generating material comprises sodium borohydride.

Hydrogen generation may occur when the hydrogen generating material is placed in a moisture-containing environment, for example, as found in most oxygen-sensitive foods and beverages. Thus, initiation of hydrogen generation generally will coincide with the filling of the container or placement of the hydrogen generator near a filled container. If necessary, contact of the hydrogen generator with moisture prior to placement of the individual closures onto containers may be minimized using any suitable techniques known in the art (e.g., placing dessicant(s) inside the packaging with the closures). It is also contemplated that moisture generated by the scavenging reaction could also be removed or minimized, if necessary, using any suitable techniques known in the art (e.g., placing dessicant(s) inside the container). If the food or beverage already contains significant quantities of water, however, additional moisture in the container may not be of concern.

The container may include a closure. The closure preferably includes the hydrogen generating compound, such as sodium borohydride, as part of the liner of the closure. The closure may be releasably secured to a container body so that it can be removed and replaced, for example, by being screw-threaded; or may be arranged to be removed but not replaced, for example, by comprising a film which is adhered to the container body. The container may include both a film closure which may provide an aseptic seal for the container and a releasably securable closure, both of which may independently include hydrogen generating materials.

The combination of the hydrogen generating closure and a container made from polymers including highly dispersed nanoparticles of oxygen scavenging catalysts provides for containers having excellent and uniform oxygen scavenging properties. Additionally, the uniform and fine nanoscale dispersion of a small amount (e.g., 10 ppm or less) of platinum group metal oxygen scavenging catalyst throughout the polymer composition provides for polymer packaging and containers with high clarity and high transparency (e.g., 85% transmission or greater). This invention provides for viable, clear plastic alternatives in the food packaging industry.

Although illustrated and described above with reference to certain specific embodiments and examples, the present invention is nevertheless not intended to be limited to the details shown. Rather, various modifications may be made in the details within the scope and range of equivalents of the claims and without departing from the spirit of the invention.

It is expressly intended, for example, that all ranges broadly recited in this document include within their scope all narrower ranges which fall within the broader ranges. In addition, features of one embodiment may be incorporated into another embodiment.

What is claimed is:

1. A method of making a polymer composition comprising dispersed nanoparticles, the method comprising:
    polymerizing one or more monomers or pre-polymers in the presence of a catalyst or catalyst precursor comprising a platinum group metal to obtain a polymer composition comprising dispersed nanoparticles of the platinum group metal,
    wherein the catalyst or catalyst precursor is added before or during the polymerization as a solution comprising the platinum group metal or a compound thereof and a polyhydric alcohol.

2. The method of claim 1, wherein the polymer composition comprises a polyester.

3. The method of claim 1, wherein the polymer composition comprises polyethylene terephthalate (PET).

4. The method of claim 1, wherein the platinum group metal comprises palladium.

5. The method of claim 1, wherein the catalyst or catalyst precursor comprises a platinum group metal compound comprising a carboxylate, a sulfonate, or a phosphanate.

6. The method of claim 1, wherein the dispersed nanoparticles of the platinum group metal is an oxygen scavenging catalyst.

7. The method of claim 1, wherein the polyhydric alcohol comprises a glycol.

8. The method of claim 1, wherein the polyhydric alcohol is ethylene glycol.

9. The method of claim 1, wherein the polyhydric alcohol is selected from the group consisting of ethylene glycol, propylene glycol, butylene glycol, butane diol, terephthalic acid, and mixtures thereof.

10. The method of claim 1, wherein the dispersed nanoparticles are present in an amount of 10 ppm or less.

11. The method of claim 1, wherein the dispersed nanoparticles comprise an average diameter of 5 nm or less.

12. The method of claim 1, wherein the polymer composition comprising the dispersed nanoparticles is substantially clear.

13. The method of claim 1, wherein the catalyst or catalyst precursor is not melt blended with the polymer composition.

14. The method of claim 1, wherein the catalyst or catalyst precursor comprises a platinum group metal compound comprising an acetate.

15. The method of claim 14, wherein the platinum group metal compound is palladium acetate.

16. The method of claim 1 further comprising forming a wall for a package or container from the polymer composition.

17. The method of claim 16, wherein the wall is formed by injection molding or stretch blow molding.

18. A food or beverage container comprising:
    a wall comprising the polymer composition having dispersed nanoparticles obtained from the method of claim 1; and
    a closure comprising a hydrogen generating material.

19. The food or beverage container of claim 18, wherein the hydrogen generating material comprises sodium borohydride.

20. A method of making a polyethylene terephthalate composition comprising dispersed nanoparticles of an oxygen scavenging catalyst, the method comprising:
    adding a glycol solution comprising a palladium compound before or during polymerization of polyethylene terephthalate to form a polyethylene terephthalate composition comprising dispersed nanoparticles of palladium.

* * * * *